United States Patent [19]

Burger

[11] 4,426,759

[45] Jan. 24, 1984

[54] PROCESS FOR THE REPEATED FABRICATION OF A STRUCTURE

[76] Inventor: Raymond Burger, 7, place de la Fleur, Sainte-Marie-Aux-Mines (Haut-Rhin), France

[21] Appl. No.: 333,268

[22] Filed: Dec. 22, 1981

[30] Foreign Application Priority Data

Dec. 22, 1980 [FR] France ................................ 80 27644

[51] Int. Cl.[3] ............................................ B23Q 17/00

[52] U.S. Cl. ...................................................... 29/407

[58] Field of Search ................. 100/913, 53, 209, 210; 29/407, 798; 33/16, 1 AA; 353/28, 29

[56] References Cited

U.S. PATENT DOCUMENTS

| | | | |
|---|---|---|---|
| 1,916,567 | 7/1933 | Grant . | |
| 2,531,375 | 11/1950 | Delegard . | |
| 3,538,843 | 11/1970 | Lubin . | |
| 3,763,547 | 10/1973 | Blakeslee . | |
| 3,785,277 | 1/1974 | Schmitt . | |
| 3,888,169 | 6/1975 | McNaughton . | |
| 3,939,548 | 2/1976 | Juriet et al. | 100/913 |
| 4,089,107 | 5/1978 | Sanford | 29/798 |
| 4,222,036 | 9/1980 | Troukens | 353/28 |

FOREIGN PATENT DOCUMENTS

| | | |
|---|---|---|
| 335785 | 4/1921 | Fed. Rep. of Germany . |
| 1528091 | 2/1970 | Fed. Rep. of Germany . |
| 1528135 | 7/1970 | Fed. Rep. of Germany . |
| 2630332 | 1/1978 | Fed. Rep. of Germany . |
| 2453007 | 10/1980 | France . |
| 435682 | 10/1967 | Switzerland . |
| 2001572 | 2/1979 | United Kingdom . |

*Primary Examiner*—Howard N. Goldberg
*Assistant Examiner*—Steven E. Nichols
*Attorney, Agent, or Firm*—Young & Thompson

[57] ABSTRACT

Wooden structures are assembled from a plurality of wooden elements with interposed metallic connectors, by assembling the wooden elements on a work table provided with a rectangular grid. The image of the structure to be assembled, with a superposed grid corresponding to the grid on the table, is projected on the table until the respective grids register with each other. Then the wooden elements are assembled on the picture; and as the corners of the grid on the table are tapped holes, retainers can be used to hold the assembled elements in place. The table with thus-assembled wooden elements is then run through an endless belt press having superposed convergent runs, whereby the metallic connectors are sunk into the wooden elements to complete assembly of the structure, after which the completed structures are removed from the tables onto rollers with interspersed lifting arms that swing vertically about an axis parallel to the direction of movement of the tables. The arms are mounted on a carriage that moves horizontally perpendicular to the direction of movement of the tables to deliver a completed wooden structure to a stack and to return to receive the next structure.

3 Claims, 3 Drawing Figures

PROCESS FOR THE REPEATED FABRICATION OF A STRUCTURE

The present invention relates to a process and apparatus for producing from a pattern, uniplanar wooden assemblies particularly useful as framework or industrial constructions as well as having other uses.

At present, the art provides for laying out on a surface such as a tracing table, a full-scale drawing of the assembly to be produced by a known technique. Following the drawing, a model is made which serves as a frame for the repeated fabrication of like assemblies.

An improvement of this technique consists in calculating the length and the angles of each element to be assembled as well as the coordinates of the points of connection between the assembled elements.

When metallic connectors are used for assembly, the known means for sinking these into the wood are plate presses or roll presses.

On the other hand, it is known to use for the handling of the constructions once assembled, mechanical or hydraulic hoists.

The invention has as its object to overcome the drawbacks of known systems, and to provide a process and apparatus for assembling wooden constructions which will be simple, exact, rapid and easy.

According to the invention, the process comprises projecting an image on a movable assembly table, positioning the image relative to a quadrangular network of reference marks on the table, utilizing this image to position the holding members for the elements to be assembled, exerting on the moving table with its unassembled elements a progressively increasing compression between two surfaces, thereby to force the wooden elements into assembly, and removing and automatically stacking the assembled structures.

The apparatus for performing the process comprises a movable assembly table, a projector displaceable along the table perpendicular to it, a press for progressively compressing the workpieces on the table comprising two power-driven endless metallic belts, a stacking machine comprising a laterally movable carriage, and lifting arms.

The quadrilateral network is itself full scale but is reproduced on a reduced scale on a transparent sheet whose projected image is juxtaposable with the plane in which the construction is to be formed.

The process is based on the concept that only the junction points, commonly called "nodes", are useful for the assembly of the structure.

With the aid of a transparent quadrilateral grid, one can chose a square or rectangular zone defined by four reference points, in which is located a "node" which it is desired to reproduce on the tracing table.

Preferably by calculation, the coordinates comprising the abscissa and the ordinate of the junction or node are determined relative to the four reference points.

Working from these junction points, a guiding print can be effectuated on a reduced scale, say, of 1:3, which is as close as possible to full scale so as to maintain maximum precision.

The design with the four reference points precisely located relative thereto, corresponding to the four reference points on the tracing table, will be reproduced on the transparent support, for example by means of photocopying or the like.

The enlarged image of this design will then be projected at full scale by means of a projector, for example a rectroprojector using a Fresnel lens, with maximum precision of the image.

The axis of projection of the image is perpendicular to the surface of the table so as to avoid distortions, and the focal length of the projector can be adjusted to obtain the desired scale of enlargement.

The mobile projector above the table is displaced in a direction parallel to the plane of the table, and the operator causes the four reference points of the design to be projected in precise registry with the four corresponding reference points on the table.

Not only the enlargement but also any distortion may be corrected, and one obtains a high exactitude of the projected full-scale image, when the four reference points of the design register precisely with the four corresponding reference points on the table.

The table is preferably provided with tapped holes at each reference point or junction, these holes serving for the securement of positioning members for the elements to be assembled.

After the elements and the connectors to be sunk therein are assembled, the movable table is introduced between two endless superposed spaced metal belts. These metal belts then move with their adjacent runs travelling at the same speed, the friction being reduced by rollers on which the belts run. The adjacent runs of the belts converge in the conveying direction, so as progressively to compress the workpieces between the adjacent runs of the superposed belts, in the manner of a press.

At the outlet of the press, the structure is automatically disengaged according to the advance of the table by means of a blade incorporated in the latter, and is conveyed on a roller conveyor.

This roller conveyor is provided with lifting arms which, articulated on a lateral carriage, transport the structures and stack them in vertical or inclined position against each other, the displacement of this carriage being controlled by two endless chains actuated by a motor reducer and brake which is independent of the carriage.

The invention will be better understood from a reading of the description which follows, in connection with the accompanying drawings, describing and illustrating a preferred embodiment of the invention which of course is not to be taken as limitative. In the drawings.

Figure 1:
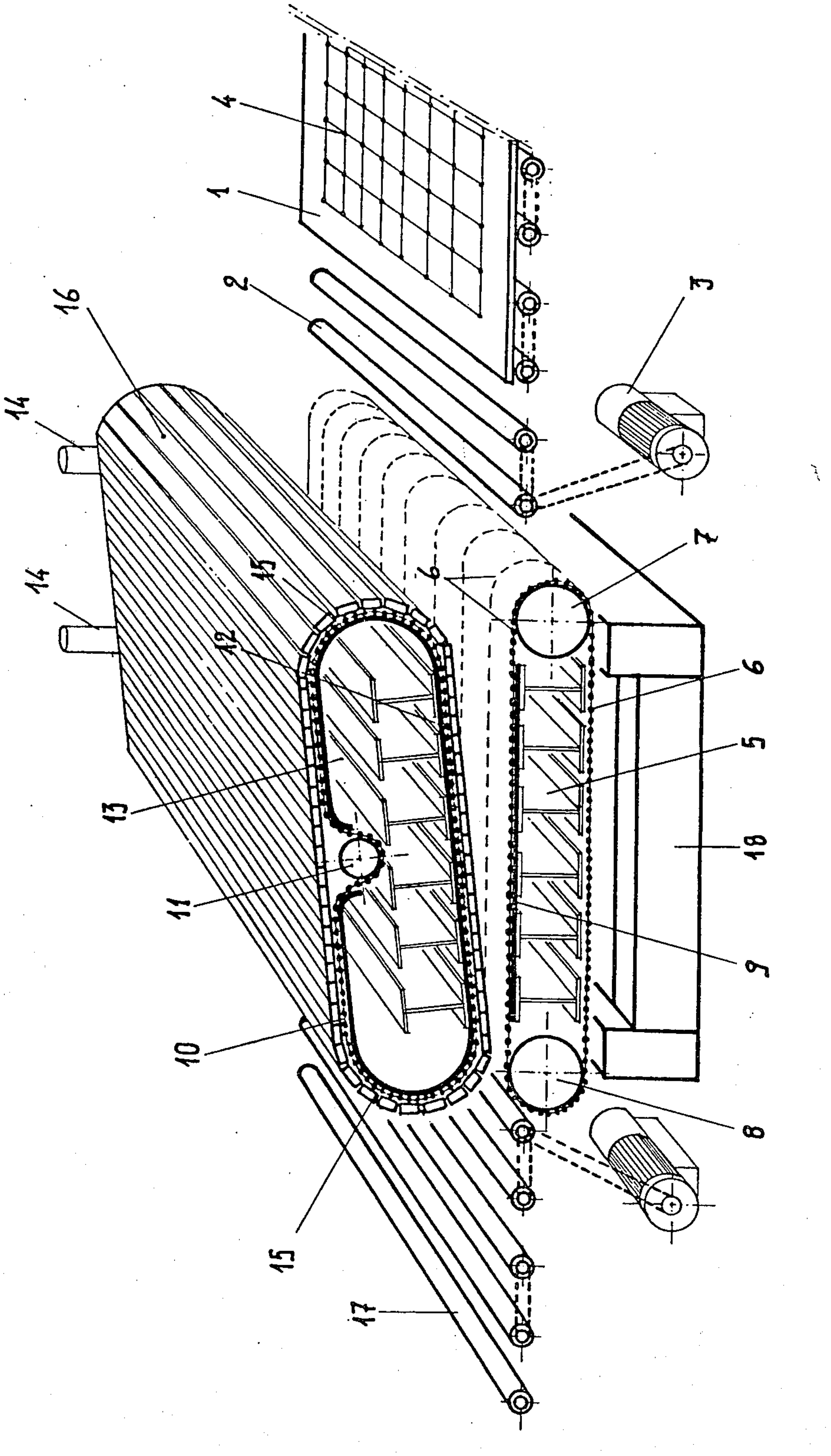
FIG. 1 is a schematic cross-sectional perspective view of apparatus according to a preferred embodiment of the invention for practicing the method of the invention.

Referring now to the drawings in greater detail, and first to FIG. 1, there is shown an assembly table 1, for example of steel, which rides on a series of rollers 2 that are power driven by chains, pinions and a motor 3 with reduction gearing. The elements to be assembled by means of connectors are maintained by positioning members (not shown), secured to table 1 by means of tapped holes 4 which are provided on substantially the entire surface of the table at regular intervals, for example every 10 cms.

A rigid frame 5 bears several chains of rollers interconnected by links, as shown at 6. These roller chains 6 are actuated by sprockets 7 and 8 and circulate on a rigid table 9, for example of steel. Roller chains 10 identical with chains 6 are actuated by a gear train 11, whose chains circulate on a rigid table 12 fixed to a support 13 adjustable as to height and inclination by means of adjusting columns 14. This inclinable table 12 is prolonged by retro-curved portions 15 which serve as guides for the rolling of the chains 10. A metal screen 16, formed for example of parallelepipedal steel slats articulated to each other by cylindrical pins, overlies the roller chains 10. If desired, the lower conveyor can be an endless belt of the same construction as the upper belt. A series of rollers 17, similar to rollers 2 but downstream of the endless belts, is actuated by the same mechanism as shown at 3 in connection with rollers 2.

The operation of the apparatus is as follows:

The wooden elements to be assembled being positioned on the table 1 as previously described, the operator actuates simultaneously the roller systems 2, 17, 6 and 10. Thus, the rollers 2 and 17 turn counterclockwise as seen in FIG. 1 and the endless belt superposed conveyors provided by the articulated steel slats 16 found both on the upper and on the lower of the superposed coacting conveyors, move with their adjacent runs moving at equal horizontal speeds to the left as seen in FIG. 1. The table 1, carrying the wooden workpieces and their connectors to be assembled by forcing the connectors into the wooden workpieces, moves first over the rollers 2, and then onto the lower conveyor and thence between the upper and lower conveyors. The lower or active run of the upper conveyor is inclined downwardly in the direction of travel of the workpieces and so progressively presses against the workpieces, gradually compressing them and forcing the connectors into the workpieces to assemble the workpieces during the passage of the workpieces between the superposed conveyors. The resulting high forces are absorbed by the frame 18.

The inclination of the upper conveyor is adjustable so as to determine the amplitude and rate of increase of compression. For example, it can converge with the lower conveyor at a rate of vertical displacement of the order of 3 cms. in the course of horizontal movement over a distance of 150 cms.

Figure 2:
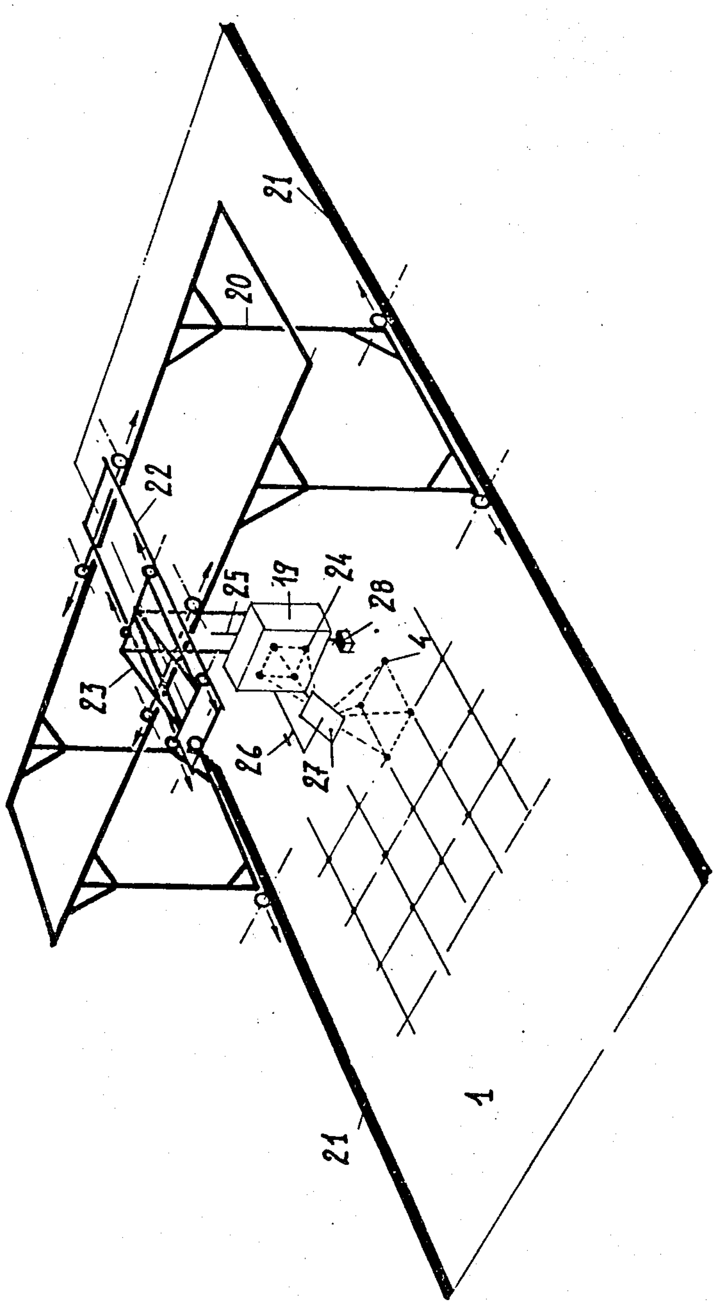
FIG. 2 is a schematic perspective view of the projection apparatus of the present invention.

FIG. 2 shows an arrangement utilizing an optical retroprojector 19 which is displaceable in a horizontal plane above the assembly table 1. The gantry 20 is displaceable on rails 21 disposed on each side of table 1 and comprises a carriage 22 movable lengthwise of gantry 20 and thus transversely of table 1. This carriage 22 comprises a further support carriage 23 for the retroprojector 19, movable transversely of gantry 20, for fine positioning on the latter.

The assembly shown in FIG. 2 can be constructed for example of thin angle members and the rollers are mounted on ball bearings, so as to enable easy manual positioning of the projector.

The rails 21 are prolonged beyond the table so as to permit displacing the gantry 20 outside the work station, until the work of positioning the nodes is completed. The operator makes use of the reference points provided by the tapped holes 4 and lines them up with the references on the drawing 24 secured in the field of view of the projector 19.

To make the four references on the table match those on the projected drawing, the operator manipulates the displacement rod 25 of the projector and also the regulating knob 26 for the focal length of the projector, the latter determing the scale of the image. By adjusting the angle of reflection of mirror 27, distortion of the image can be corrected, which is easy to detect because the respective reference points will in that case not precisely register with each other.

With this adjustment completed, and the operator being satisfied of the precise positioning of the parts, he then slides the weight 28 down on rod 25 until it comes to bear against table 1, thereby fixing the position of projector 19 and hence the orientation of the projected image. The latter then serves to guide the operator to emplace the devices for fixing the wooden workpieces, all of the necessary details being reproduced on the projected drawing with great precision.

High visibility is achieved, by painting table 1 white or a light color, so that the table serves also as a projection screen for receiving the projected image of the design.

Thanks to the ease of manipulating the device, the operator can move rapidly from one node of the structure to the next.

Figure 3:
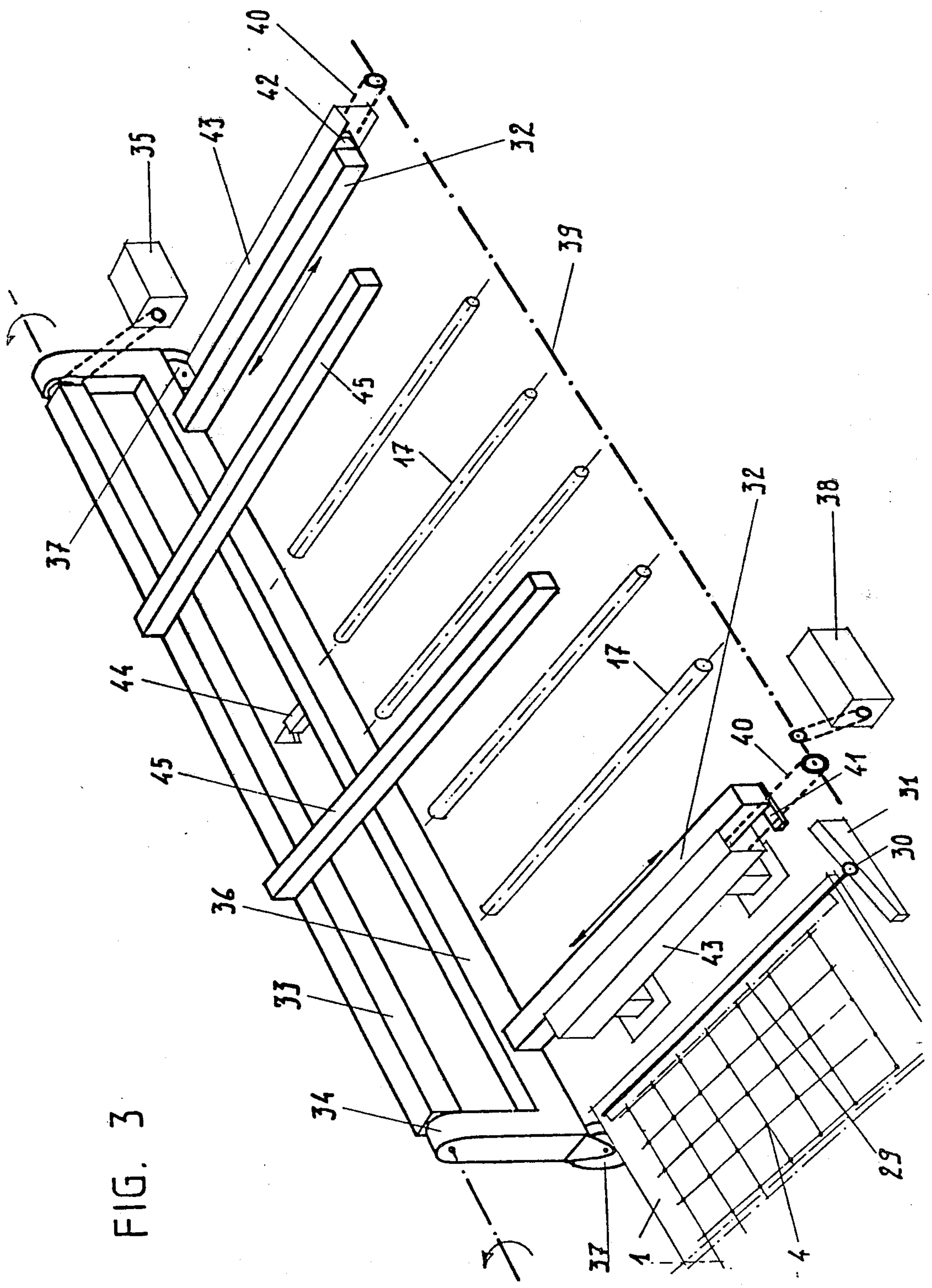
FIG. 3 is an exploded schematic perspective view of the stacking apparatus of the present invention.

FIG. 3 is an exploded perspective schematic view showing the automatic stacking apparatus for the assembled wooden constructions. In FIG. 3, the table 1 is moved from the outlet of the structure previously described, on the power driven rollers 17. Immediately above this series of powered rollers, and in a horizontal plane, is another series of rollers (not shown) to receive the assembled structures disposed on table 1. To move the assembled wooden structures from table 1 up to the superposed non-illustrated rollers, a blade 29 is provided which swings vertically on table 1 under the action of a roller 30 that mounts an inclined plane 31. The blade raises the assembled article on table 1 sufficiently that further movement of the table 1 to the upper right as seen in FIG. 3, shoves the article onto the non-illustrated rollers.

A plurality of arms 45 is spaced apart lengthwise of and interposed between various of the non-illustrated superposed rollers. Arms 45 are mounted on a beam 33 for vertical swinging movement about the axis of the beam as shown by the arrows at the top of FIG. 3. An abutment provided with a limit switch (not shown) is located along the path of rollers 17 and is struck by the now-empty table 1, to actuate the mechanism that swings arms 45 counterclockwise as seen in FIG. 3. During this swinging movement, beam 33 rotates in bearings 34 at its ends, under the influence of a reduction motor 35.

When the arms 45 are swung to a position raised about 70° from the horizontal, a carriage 36 which supports bearings 34 and hence beam 33, arms 45 and the wooden assemblies supported by the arms 45, is caused to move to the upper left as seen in FIG. 3; and for this purpose, carriage 33 is mounted on rubber-tired wheels 37. This movement of the carriage 36 away from the path of table 1, is powered by a reduction motor 38 which itself is controlled by a limit switch (not shown) actuated by beam 33 when it has swung to the 70° position mentioned above. Reduction motor 38 rotates a shaft 39 on which are keyed sprockets which drive two endless chains 40 shown at the upper right and lower left of FIG. 3, these chains lying alongside arms 32 which are secured at their upper left ends as seen in FIG. 3 to the carriage 36. Members 41 interconnect chains 40 with arms 32, so that as chains 40 circulate in one direction or the other under the influence of the reversible reduction motor 38, arms 32 will reciprocate along the paths indicated by the double-headed arrows adjacent thereto in FIG. 3. The arms 32, in turn, carry rollers 42 which ride within channel members 43 fixed to the machine frame, which rollers thus ensure that arms 32 maintain their horizontal position while reciprocating.

The arms 45 thus deliver the assembled articles to the top of a stack of previously assembled wooden articles, to increase the size of the stack as much as desired. A feeler 44 carried by carriage 36 contacts this stack when carriage 36 moves away from the path of tables 1; and this contact of feeler 44 reverses the reduction motors 35 and 38, to swing the arms 45 clockwise to their original horizontal position and to move the carriage 36 back toward the path of tables 1.

By way of example, and to give an indication of the performance that can be obtained with the present invention, using a table having a speed of advance of, say, 1 meter per second, the assembly operation can be completed in less than 40 seconds.

Finally, no matter what embodiment the present invention takes, a certain number of advantages will be enjoyed, among which may be mentioned the following:

the laying out of the structure to be assembled can be effected rapidly, easily and accurately.

the positioning of the elements of the wooden structure to be assembled does not require large or heavy pieces to be handled at each change of design, thanks to the use of the projected picture and the assembly tables provided with tapped holes.

the sinking of the metallic connecting members in the wooden workpieces is effected in a very rapid manner, continuously, and between two flat surfaces, which ensures optimum assembly with the cheapest and most readily available types of connectors.

the automatic stacking of the completed structures is easy thanks to the apparatus provided, and the stacks are adapted easily to be handled by means of known handling devices such as fork lifts.

by the assembly of a series of devices according to the present invention upstream and downstream of the apparatus, a high production can be achieved even if rapid model changes and short model runs are involved.

by storing and classifying the transparent master designs to be applied to the optical projector, the most varied designs can be quickly reproduced with unvarying accuracy.

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Process for assembling a wooden structure, comprising providing a table having a rectangular reference grid thereon, projecting on the table an image of at least a portion of the wooden structure to be created with at least a portion of a rectangular grid corresponding to the rectangular grid on the table, as a portion of said image, bringing the rectangular grid of the image into registry with the rectangular grid on the table, assembling a wooden structure from wooden members with interposed connecting members on the table in accordance with said projected image, compressing the wooden members with interposed connecting members against the table to effect assembly of the wooden structure, and removing the assembled wooden structure from the table.

2. Process as claimed in claim 1, in which said compression is effected gradually and progressively between two flat converging surfaces that move at the same speed in their direction of convergence.

3. A process as claimed in claim 1, and providing on said table tapped holes at the corners of the rectangular reference grid on the table, and securing in said tapped holes members which hold the wooden elements in assembly prior to said compression.

* * * * *